WATCH CALENDAR SETTING MECHANISM

Original Filed Nov. 10, 1966 3 Sheets-Sheet 1

INVENTORS
DONALD J. ROGERS
JOHN A. VAN HORN
BY LeBlanc & Shur
ATTORNEYS

WATCH CALENDAR SETTING MECHANISM

Original Filed Nov. 10, 1966 3 Sheets-Sheet 2

INVENTORS
DONALD J. ROGERS
JOHN A. VAN HORN

BY Le Blanc & Shur

ATTORNEYS

WATCH CALENDAR SETTING MECHANISM

Original Filed Nov. 10, 1966 3 Sheets-Sheet 3

INVENTORS
DONALD J. ROGERS
JOHN A. VAN HORN
BY LeBlanc & Shur
ATTORNEYS

United States Patent Office

Re. 27,290
Reissued Feb. 22, 1972

27,290

WATCH CALENDAR SETTING MECHANISM

Donald J. Rogers and John A. Van Horn, Lancaster, Pa., assignors to Hamilton Watch Company, Lancaster, Pa.

Original No. 3,427,798, dated Feb. 18, 1969, Ser. No. 593,374, Nov. 10, 1966. Application for reissue Apr. 1, 1970, Ser. No. 24,891

Int. Cl. G04b *19/24*

U.S. Cl. 58—58 19 Claims

Matter enclosed in heavy brackets [ ] appears in the original patent but forms no part of this reissue specification; matter printed in italics indicates the additions made by reissue.

ABSTRACT OF THE DISCLOSURE

The watch calendar setting mechanism has a rotatable stem axially movable into three positions. A pivoted setting wheel is biased into engagement with a clutch slidably mounted on the stem. When the stem is in an innermost position, the setting wheel engages the watch winding mechanism. When the stem is in an intermediate position, the setting wheel engages the calendar ring which may then be rotated in response to rotation of the stem. When the stem is in the outermost position, the setting wheel engages a hand setting gear. The dial train continuously drives the calendar ring through a slip clutch.

This invention relates to a novel calendar ring drive and date setting mechanism for the date indicating or calendar devices of a timepiece and more particularly to an improved three-position setting mechanism particularly suited for use in an electric watch having a continuously driven calendar ring. It is intended primarily for electric watch movements having or being adaptable to a three-position setting stem where the additional stem position is for manual date setting of the calendar ring.

In typical existing calendar watch systems, the dial side of the movement is provided with a calendar ring or disc that is rotatably mounted below the dial and bears 31 equally spaced numbers which are successively exposed through a window in the dial as the ring is advanced 1/31 of a revolution each 24 hours by a drive system interconnecting the calendar ring with the dial train of the watch. In most systems the dial train is effectively disconnected from the calendar indicia ring for about 21 hours with the appropriate date number of the calendar ring being exposed through a window in the watch dial to indicate the date. In the remaining three hour period, the dial train is drivingly engaged with the calendar ring, usually by a camming arrangement, so as to cause the calendar ring to advance 1/31 of a revolution. The dial ring is thus progressively moved in the remaining three hour period which is usually around midnight, until the next date number is beneath the aforementioned dial window. The date number is exposed for the next 21 hours and is thereafter replaced by the next successive number when the calendar ring is again drivingly engaged with the dial train by the intermediate camming arrangement and thus displaced.

Such existing calendar watch systems are not completely desirable in that the date change takes place over a substantial period of time, i.e., approximately 3 hours, and for much of this time the numerals are not readily readable through the dial window. In addition, they impose a quite high load on the source of power driving the dial train, and this load is more than existing electrical watch systems can bear with a compact, long-lived power source.

In order to overcome these difficulties, it has been proposed to provide a continuous connection between the dial train and the calendar ring which is continuously driven. A system of this type, as disclosed in assignee's U.S. Patent No. 3,240,006, substantially reduces the power load on the drive source, i.e., battery of an electric watch. In the patented device, the dial window is enlarged and overlies a shutter mechanism including a spring biased shutter which follows the movement of the calendar ring for substantially an entire 24 hour period and at or near the stroke of midnight, jumps back to expose the next date. In this way the date numeral is at all times exposed through the overlying apertures in the shutter and dial while, at the same time, rapid and precise date change-over is effected.

The present invention is directed to an improved and novel date setting mechanism of the foregoing type particularly suited for electric watches wherein the calendar ring is continuously driven from the watch train so as to minimize the power drain on the watch battery. It incorporates a three-position setting stem including an innermost or first position, hereafter referred to as the run position of the watch, an intermediate or second position in which the calendar ring may be manually set in either direction, and a third or outermost position wherein the stem may be rotated to set the watch hands. While described in conjunction with continuously driven calendar rings in an electric timepiece, the novel setting mechanism of the present invention may be used with intermittent as well as continuously driven calendar rings and likewise is suitable for use with spring driven as well as electric watches. In the latter case, the innermost position of the setting stem is the wind position of the spring driven watch in which rotation of the stem acts to wind the watch mainspring.

In the device of the present invention, the watch setting stem carries a slidable clutch wheel moved with respect to the setting stem by a clutch lever. In the innermost or run position (wind position in a spring driven watch), the clutch wheel engages a setting wheel carried by the spring biased clutch lever. Outward movement of the setting stem to an intermediate or calendar setting position result in the clutch lever under the action of its bias spring to urge the setting wheel into engagement with teeth on the calendar ring so that rotation of the stem and the clutch wheel sets the calendar ring in either direction. Further outward movement of the setting stem into a third or hand-setting position causes a second or setting lever to engage the clutch lever so as to gear the clutch wheel through the setting wheel to the minute wheel of the watch train whereby rotation of the setting stem causes the hands of the watch to rotate.

During times that the calendar ring is being manually set independent of the watch hands, slippage between the drive train of the watch and the calendar ring is provided by a slip clutch. In one embodiment of this invention, the slip clutch takes the form of a novel synchronizer which not only disengages the continuously driven calendar ring from the watch train when the calendar ring is being set by the rotation of the setting stem but the synchronizer also acts to automatically correlate the new position of the calendar ring with the watch hands. The synchronizer comprises a shaft carrying a calendar drive pinion and a triangular cam, all of which are actuated by the watch dial train (by way of a calendar train) through a wheel and spring. The spring not only permits slippage between the wheel and the calendar ring when the latter is set, but also positions the calendar drive pinion so that the calendar ring is accurately set in relation to the wheel and hence, the watch hands.

The setting mechanism utilizes conventional components including a conventional setting wheel and is operable with both continuously and intermittently driven calendar or date rings. It is of relatively simplified, inexpensive construction, and provides reliable setting of the calendar ring in either direction without disturbing the operation of the watch hands and the shutter mechanism of the calendar watch. Synchronization of the calendar ring with the watch hands may be manual or if desired automatic through the provision of a novel synchronizer structure which automatically effects a fine adjustment of the calendar ring to bring it into a position in full accord with the particular setting of the watch hands. The watch or other timepiece may have it calendar ring adjusted completely independent of the watch hands whether or not the watch is running or fully stopped.

It is therefore one object of the present invention to provide a novel setting mechanism for the date indicating disc or ring of a calendar timepiece.

Another object of the present invention is to provide a simplified three-position setting stem mechanism which in one position sets the calendar ring of either a continuously or intermittently driven calendar watch or timepiece.

Another object of the present invention is to provide a novel three-position setting mechanism particularly adapted for use with a continuously driven calendar ring operated from a low energy source such as the battery of an electric watch.

Another object of the present invention is to provide a novel synchronizer which not only permits slippage between the calendar ring and watch drive during manual settnig of the calendar ring but also automatically synchronizes or fine sets the position of the calendar ring in relation to the watch hands.

Another object of the present invention is to provide a simplified and more reliable calendar ring setting mechanism for all types of watches and timepieces.

These and further objects and advantages of the invention will be more apparent upon reference to the following specification, claims and appended drawings, wherein:

Figure 1:
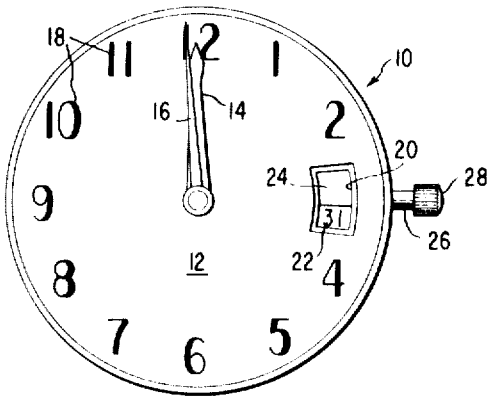
FIGURE 1 is a view of the dial side of an electric calendar watch constructed in accordance with the present invention.

Referring to the drawings, the novel watch of the present invention, generally indicated at 10 in FIGURE 1, comprises a dial 12 over which pass the hour hand 14 and minute hand 16. The dial carries a plurality of numerals 18 indicating the hours of the day.

Formed in the dial 12 is a window 20 through which can be seen the indicia 22 on a date ring located within the watch which indicia shows the calendar date. Overlying the date ring is a shutter 24 for a purpose more fully described below. As illustrated in FIGURE 1, the watch indicates 11:59 p.m. of the 31st day of the month. Projecting outwardly from the watch, near the 3 o'clock position, is a setting stem 26 adapted to be manually actuated by means of knurled knob 28.

Figure 2:
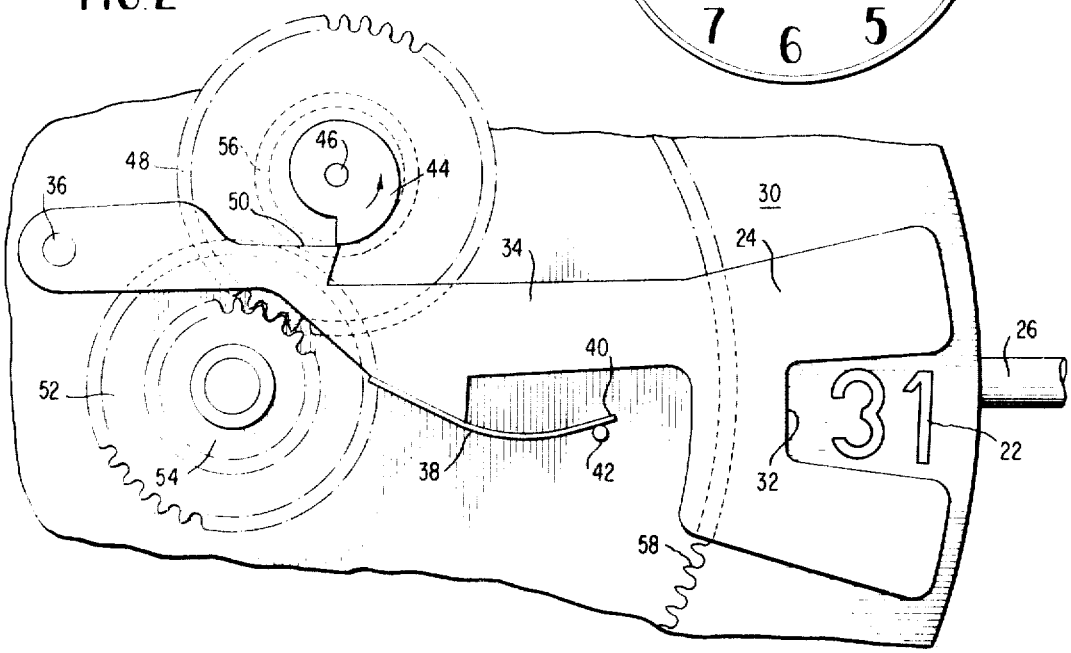
FIGURE 2 shows the shutter assembly for rapid calendar date changeover in the watch of FIGURE 1.

FIGURE 2 shows the shutter 24 of FIGURE 1 overlying a date ring 30 carrying the indicia 22. The outermost end of the shutter is generally U-shaped to define an aperture 32 through which the date indicia is exposed. The shutter includes an elongated arm 34 pivotally supported at its other end on a stationary element of the watch is indicated at 36. Pivot 36 permits the aperture 32 of the shutter to follow the indicia 22 on the date ring for a period of approximately 24 hours.

Suitably attached to the arm 34 of the shutter is an elongated flat spring 38 with its free end 40 engaging a stationary pin 42. Spring 38 acts to bias the shutter in a counterclockwise direction.

A can 44 mounted on staff 46 for rotation with wheel 48 engages a cam follower surface 50 on the shutter to drive the shutter in a clockwise direction. In FIGURE 2 the shutter is indicated as just about to snap back to the next date, i.e., the first of the next month, since the cam follower surface 50 is about to drop off the radial outermost portion of the cam surface to the radially innermost portion of this surface and the shutter is urged in this return direction by spring 38. Cam 44 is driven from center wheel 52 of the watch by a suitable gear train including pinion 54 and gear 56.

Center wheel 52 forms a portion of the dial train of the watch which train is driven by the watch battery to rotate the hands 14 and 15 of FIGURE 1. The curvature of cam 44, the pivot radius of the shutter, and the associated parts are chosen so that the shutter 24 follows the movement of the date ring 30 as the watch is driven and the hands rotated. That is, the shutter is driven in synchronism with the watch hands, such that the shutter advances one step each 24 hours and at a speed coincident with the movement of the calendar ring so that a particular date indicia 22 is continuously exposed through the aperture 32 for substantially each 24 hour period of movement of the watch hands. The date ring 30 is driven by way of its internal teeth 58 from a calendar train and the drive system described below.

Figure 3:
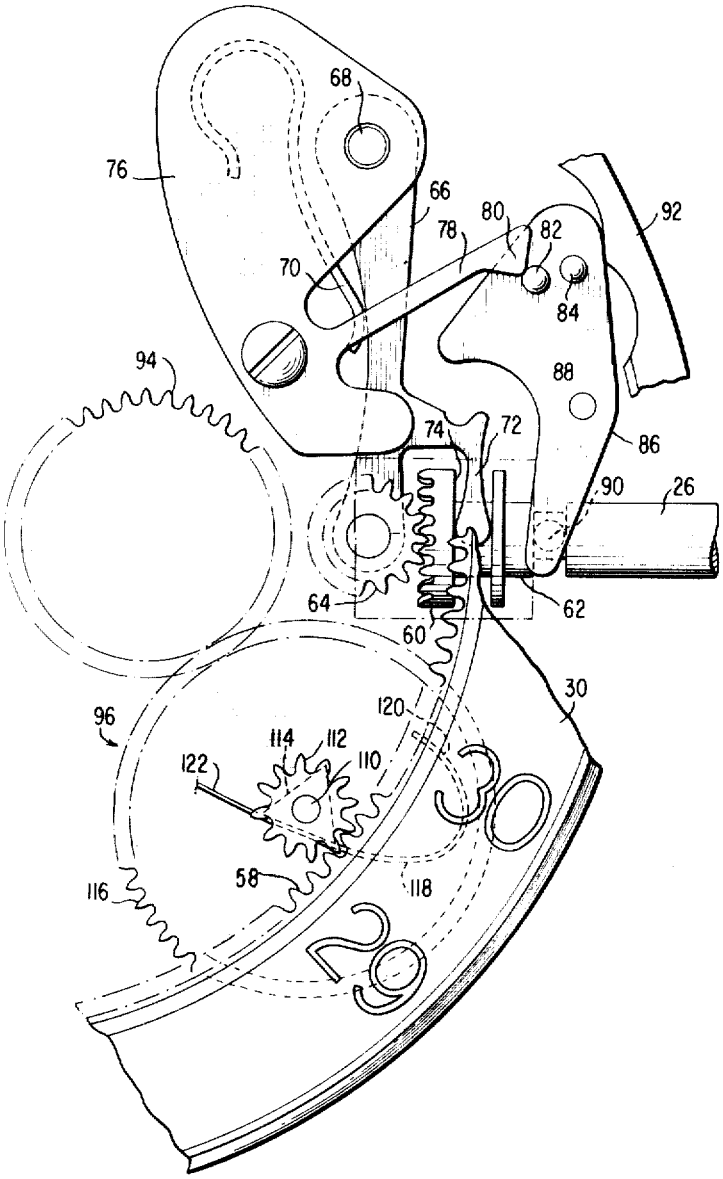
FIGURE 3 is a diagram illustrating the novel three-position setting mechanism of the present invention with the setting stem in its innermost or run position.

As previously discussed, the calendar ring 30 is continuously driven from the dial train of the watch. However, several months of the year have less than 31 days and at the end of such a month it is necessary to advance the calendar ring to the first day of the next month. Similarly, should the watch stop for any substantial length of time, it usually becomes necessary to manually rotate the calendar ring either forward or back as desired to the correct date indication. FIGURE 3 illustrates a novel setting mechanism constructed in accordance with the present invention including apparatus for manually adjusting the position of the calendar ring in either direction.

Referring to FIGURE 3, setting stem 26 is illustrated in its radially innermost or run position. In a spring driven watch (as opposed to the electric watch in the preferred embodiment of this disclosure) the innermost position of the setting stem 26 is the wind position such that rotation of the setting stem acts to wind the main spring barrel of the watch. Keyed to the setting stem 26 for sliding movement along the inner end of the stem but adapted to rotate with the setting stem 26, is a toothed clutch 60. Clutch 60 abuts against setting stem shoulder 62 and is illustrated in FIGURE 3 with its teeth meshing with the teeth of a setting wheel 64. Setting wheel 64 is pivotally mounted to the watch by a clutch lever 66 pivoted as at 68. Setting wheel 64 is mounted on the free end of lever 66. Bearing against an intermediate portions of the lever is a clutch lever spring 70 biasing lever 66 in a counterclockwise direction about its pivot 68. The other end of spring 70 is suitably secured to a stationary part of the watch. Clutch lever 66 is also provided with a follower projection 72 received in an annular clutch slot 74 such that the clutch 60 is translated along setting stem 26 in accordance with the movement of lever 66 about its pivot.

Stationarily mounted in the watch is a setting cap spring 76 having a spring arm 78 with a tip 80 adapted to engage one of the pins 82 and 84 mounted on a second or setting lever 86. Setting lever 86 is pivoted at 88 and carries a follower 90 movable longitudinally with the outward movement of the setting stem so as to rotate setting lever 86 about its pivot 88 in a counterclockwise direction. The uppermost end of lever 86 abuts against a pillar plate stop 92.

Calendar ring 30 is driven from a minute wheel 94 of the dial train through a synchronizer generally indicated at 96 meshing with the internal teeth 58 on the calendar ring in a manner more fully described below. For the present, it is sufficient to state that the synchronizer provides slippage, i.e., acts as a slip clutch, so that the calendar ring is effectively disengaged from the minute wheel 94 when the calendar ring is being rotated through setting wheel 64 by manual rotation of setting stem 26.

Figure 4:
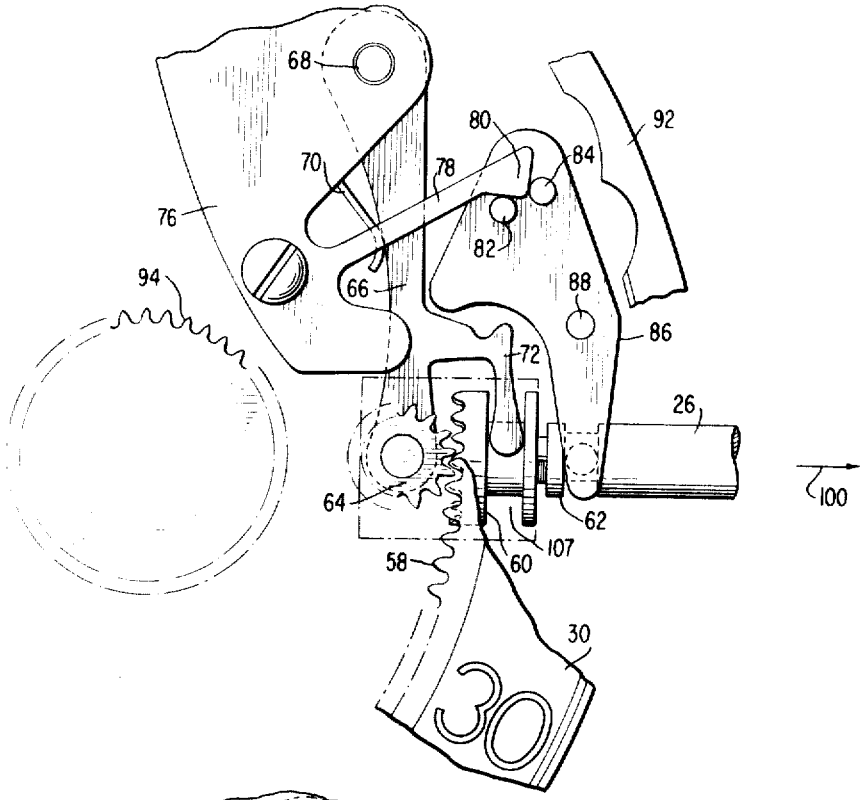
FIGURE 4 is a view similar to that of FIGURE 3 with the setting stem in its intermediate or manual calendar ring set position.

FIGURE 4 illustrates the setting stem 26 as having been pulled outwardly in the direction of the arrow 100 in FIGURE 4 to a middle or intermediate position. At this time, tip 80 of cap spring 78 is engaged between the pins 82 and 84 on setting lever 86 to hold the setting lever and hence the setting stem 26 in this intermediate position. That is, spring arm 78 acts as a detent on the pins to position setting stem 26. At the same time, clutch lever 66 has rotated in a counterclockwise direction under the influence of spring 70 to bring setting wheel 64 into engagement with the internal teeth 58 on calendar ring 30. Rotation of setting stem 26 will cause setting wheel 64 to move the calendar ring either ahead or behind depending upon the direction of rotation of the setting stem.

Figure 5:
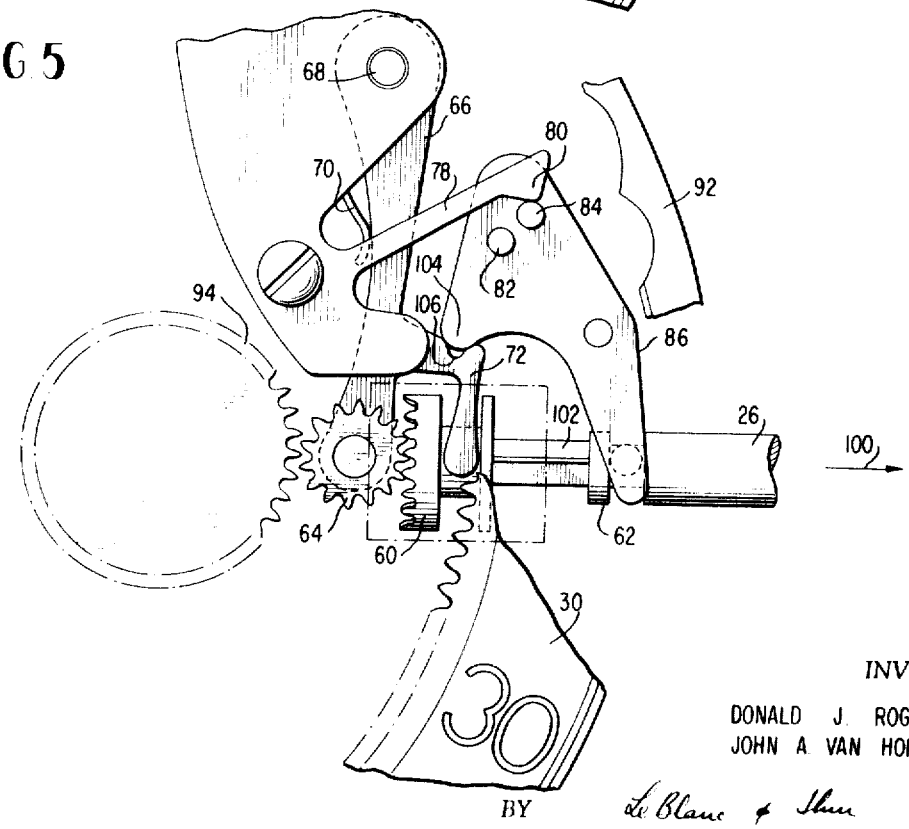
FIGURE 5 is a view similar to that of FIGURES 3 and 4 with the setting stem in its third or outermost position whereby rotation of the setting stem acts to set the watch hands.

In FIGURE 5, the setting stem has been pulled to its outermost third position in which the hands of the watch may be set. In this position, the rectangular, reduced cross section portion 102 of the setting stem 26 along which clutch 60 slides is clearly visible. The clutch is provided witb a similar rectangular aperture mating with the rectangular shaft 102 such that while the clutch may slide along the shaft, it is keyed to the setting stem so that it rotates with it. In this figure, tip 80 of the setting cap spring arm engages the pin 84 to detent setting lever 86 and therefore setting stem 26 into the third outermost position. In this position, a cam 104 on the setting lever engages the follower arm 72 of clutch lever 66 rotating the lever in a clockwise direction about its pivot 68 against the action of bias spring 70. Rotation of the lever causes the clutch 60 to more inwardly, still with its teeth in meshing engagement with the teeth of setting wheel 64. However, setting wheel 64 carried by the clutch lever is also in engagement on its diametrically opposite side from the clutch with the teeth of minute wheel 94. Rotation of setting stem 26 in this third position causes clutch 60 through setting wheel 64 to rotate minute wheel 94 and hence hands 14 and 16 of the watch of FIGURE 1 through the conventional dial train.

In operation, when the watch is running, setting stem 26 is in the "in" position illustrated in FIGURE 3, where the setting wheel 64 is not engaged with the minute wheel 94 or the teeth 58 of the date ring 30, but the setting wheel 64 is engaged with the teeth of the clutch 60. Setting wheel 64, which is pivotally mounted on clutch lever 66 is maintained in this position by the action of stem shoulder 62 and clutch slot 107 acting on the follower arm 72 of the clutch lever. The clutch lever is, of course, biased by the counterforce of the clutch lever spring 70 biasing it in the counterclockwise direction about pivot 68 in FIGURE 3. The locking action of the tip 80 of the setting cap spring 78 against pin 82 of the setting lever 86 causes the setting lever to thereby be forced against the pillar plate stop 92, locking setting stem 26 in this position. Setting stem 26 has the square cross section portion of its shaft 102 best seen in FIGURE 5 radially inward from the stem shoulder 62 and clutch

60 has a similar square hole which does not permit the clutch 60 to rotate about square shaft section 102, but permits the clutch to slide freely upon this section of the stem. With this arrangement, rotation of stem 26 in the position illustrated in FIGURE 3 rotates clutch 60 and setting wheel 64 but performs no other function in the electric movement of the preferred embodiment. In a spring-driven movement, clutch 60 at this time meshes with a conventional ratchet wheel (not shown) and thereby drives a winding train.

FIGURE 4 shows the stem 26 in the intermediate or calendar set position where setting wheel 64 is engaged with the teeth of the date ring 30 due to the counterclockwise rotation of clutch lever 66 under the influence of spring 70. The withdrawal of shoulder 62 of the setting stem into the position illustrated in FIGURE 4, permits the clutch 60 to move toward the position illustrated in FIGURE 4. Setting wheel 64 is, of course, sufficiently thick so that its teeth in this position engage both the teeth of the clutch 60 and the teeth 58 of the calendar ring 30 above the clutch.

The action of the tip 80 of the setting cap spring arm 78 between pins 82 and 84 of the setting lever 86 maintains stem 26 in the position illustrated in FIGURE 4. Rotation of stem 26 in this position thereby serves to rotate or adjust date ring 30 in either a clockwise or counterclockwise direction as is necessary to bring it to the correct date. This rotation is effected by manual twisting or turning of the knurled knob 28 illustrated in FIGURE 1.

FIGURE 5 shows the fully out or "hand set" position of stem 26 in which setting wheel 64 is in engagement with both the teeth of minute wheel 94 and the teeth of clutch 60 due to the clockwise rotation of clutch lever 66 and by the cam tip 104 of setting lever 86. The position illustrated in FIGURE 5 is maintained by the locking action of the tip 80 of the setting cap spring arm 78 against pin 84 and the cam tip 104 of the setting lever 86 against the notch 106 of clutch lever 66. Rotation of stem 26 in this position serves to rotate the dial train (not shown) through minute wheel 94 for adjustment of the watch hands 14 and 16 of FIGURE 1.

The synchronizer 96 illustrated in FIGURE 3 permits slippage between the dial train of the watch and the calendar ring 30 when the calendar ring is being manually adjusted from the setting stem in its intermediate position illustrated in FIGURE 4. Referring to FIGURE 3, synchronizer 96 provides a drive connection from the dial train to the calendar ring for normal continuous drive of the calendar ring during watch operation, incorporates a slip clutch permitting slippage during the manual turning described immediately above, and further automatically synchronizes the position of the calendar ring after it has been manually set so that the calendar ring comes to rest in a position fully synchronized with the dial train and hence with the watch hands and shutter.

The synchronizer 96 in FIGURE 3 comprises a staff 110 which has an integral parts a pinion 112 and a triangular cam 114. Mounted for rotation about but independent of staff 110 is a wheel 116. This wheel is driven by a date ring train (not shown) which is in turn driven by a conventional dial train (not shown) and rotates about staff 110 on a loose bearing. One end 120 of a flat curved spring 118 is suitably fixed to the wheel 116. The opposite end 122 of this spring lies against one side of triangular cam 114 under tension. As such, the tension of spring 118 serves to drive staff 110 and its integral components as if wheel 116 and pinion 112 were integral parts during normal running of the movement. Pinion 112 meshes with teeth 58 of the calendar date ring to thereby continuously drive the date ring 30. Synchronizer assembly 96 rotates at the rate of one-third a revolution per twenty-four hours and is dimensioned such that one complete numeral change or one numeral advance of the date ring takes place every twenty-four hours.

During manual setting of the date ring 30, spring 118 acts as a slip clutch such that pinion 112 meshing with the date ring may rotate freely with respect to wheel 116 to which the other end of the spring is secured. In addition, at the end of the manual adjustment when the turning force of the operator's fingers are removed from setting stem 26, spring 118 serves to relocate triangular cam 114 in even increments of one-third a revolution due to the tension of spring 118 upon the sides of the triangular cam. This relocation of triangular cam 114 by spring 118 is brought about without at the same time rotating wheel 116. However, since pinion 112 is formed integral with the cam 114 and is in meshing engagement with the teeth 58 of the calendar ring, calendar ring 30 is also repositioned, i.e., fine positioned, by the spring so as to be in full synchronism with the watch hands and with the shutter and cam mechanism of FIGURE 2, all driven from the dial train. In other words, the tension of spring 118 acts to rotate the pinion so as to restore a predetermined relationship between pinion 112 and hence the calendar ring with respect to wheel 116 driven from the dial train. Although this relationship may be disturbed during setting of the calendar ring when the spring permits slippage, termination of the manual adjustment is followed by the tension of the spring returning the pinion and calendar ring to a position such that the spring again bears against a flat side of the triangular cam. This reestablishes the relationship between the wheel 116 and the cam (and hence the calendar ring) existing before the manual adjustment.

A simpler watch mechanism can be provided by relying upon the operator of the watch to synchronize the date ring. In this case, the synchronizer is eliminated and all that is provided between the drive wheel 116 and pinion 112 is a suitable slip clutch assembly. In this simpler and hence less expensive system, the person manually adjusting the date setting, in order to center the date numeral within the shutter window, must by visual observation center the correct date in the shutter aperture 32 of FIGURE 2.

Figure 6:
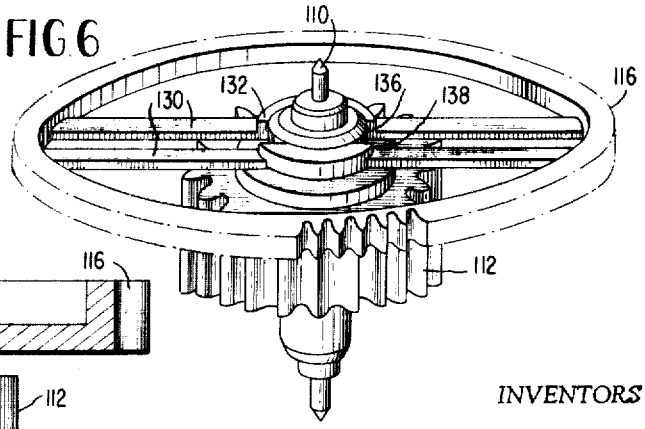
FIGURE 6 is a perspective view showing a slip clutch usable in the present invention in place of the synchronizer portion of the structure illustrated in FIGURE 3.
Figure 7:
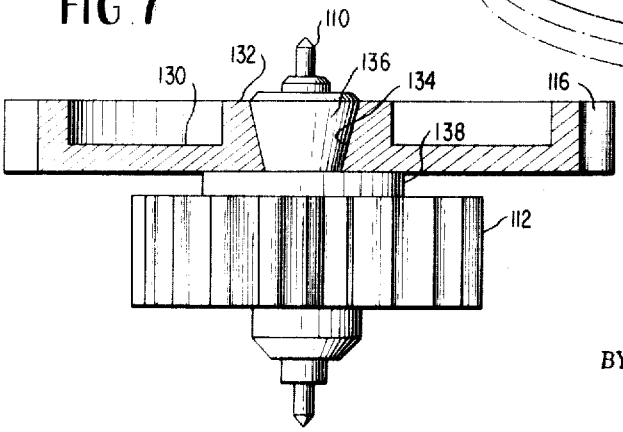
FIGURE 7 is an elevation with parts in cross section of the slip clutch of FIGURE 6.

FIGURES 6 and 7 illustrate a slip clutch which may be provided in place of the synchronizer assembly 96 of FIGURE 3. While the slip clutch of FIGURES 6 and 7 represents a preferred embodiment, it is understood that various types of suitable slip arrangements may be provided including an arrangement wherein the wheel 116 of FIGURE 3 is simply frictioned to the staff 110 of pinion 114 such that the frictional fit allows the date ring drive train (not shown) to drive the date ring 30 during normal operation but permits the assembly to slip upon manual date ring adjustment by means of stem 26. This does require that the user manually synchronize or center the numeral in the shutter aperture 32 but with a reasonable amount of care, this can be accurately done.

In FIGURES 6 and 7, wheel 116 again mounted on staff 110 is of one-piece construction to include spring arms 130 which contain an integral split hub 132. Hub 132 has a tapered hole 134 which due to the spring tension of arms 130 is frictioned to a correspondingly tapered section 136 of pinion staff 110. As before, pinion 112 is rigidly secured to the staff for rotation therewith. This arrangement permits wheel 116 to rotate independently about the axis of pinion staff 110 only when the torque created by the friction fit is exceeded. The tapered direction is such that hub 132 is forced against and thereby frictioned to a shoulder 138 of the pinion staff 110. This frictional torque can be varied during design by the amount of interference between tapered section 136 of the pinion and the hub 132 and by varying the cross section of spring arms 130.

It is apparent from the above that the present invention provides a novel drive assembly and setting stem arrangement wherein the calendar ring of a timepiece may be readily and simply set in either direction. In instances wherein a month may have less than 31 doys, it is normally necessary to advance the calendar ring at the end of the month to the first date of the next month. However, if the watch for any reason has stopped for a substantial length of time, it may be much easier to reach the correct date by turning the calendar ring back a few dates rather than ahead. The provision of a date ring adjustable in both directions avoids the necessity of advancing the ring through several weeks in instances of this type.

Although the novel setting mechanism of this disclosure has been described in conjunction with a preferred embodiment incorporating a continuously driven calendar ring energized from a low power source, such as a battery, it is apparent that the structure herein disclosed is applicable to all types of watches, clocks, and other timepieces. That is, it may be used with intermittently driven as well as continuously driven calendar discs and rings and is usable in self-winding watches as well as in spring driven timepieces which must be manually rewound. When used in the latter, the first or innermost position of the setting stem may be such as to couple the setting wheel 64 to the main spring barrel through a winding train so that upon rotation of the setting stem the barrel arbor is rotated to rewind the watch mainspring.

Important features of the present invention include its simplicity and the fact that the setting stem is positively locked or detented into each of the three possible positions, while movement from one position to another assures accurate and reliable operation of the setting mechanism. It permits the hands of the watch to be set in the usual manner by rotation of the setting stem and in all instances utilizes more or less conventional watch components. In the simplest construction, the watch is provided with a slip clutch such as that illustrated in FIGURES 6 and 7 to permit slippage between the date ring and the dial train at times when the calendar ring is manually reset. However, this simplified arrangement requires that the date ring be manually centered in the shutter aperture for proper viewing. In a second embodiment, the device, in addition to a slip clutch, incorporates an arrangement for automatically synchronizing the calender ring with the shutter and witch hands so that manual centering of the date numeral in the shutter aperture is not necessary. This combination slip clutch drive and automatic synchronizing arrangement takes the form of the synchronizer assembly 96 illustrated in FIGURE 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

[1. A setting mechanism for a calendar timepiece comprising a setting stem, detenting means coupled to said stem for detenting said stem into three separate longitudinal positions, a setting wheel, means coupling said stem to said setting wheel when said stem is in an innermost position, date indicating means, means coupling said stem to said date indicating means when said stem is in an intermediate position, dial train means, and means coupling said stem to said dial train means when said stem is in an outermost position.]

2. Apparatus according to claim [1] *21* wherein said dial train comprises a minute wheel.

3. Apparatus according to claim [1] *21* wherein said date indicating means is a calendar ring.

4. Apparatus according to claim [1] *21 wherein said* [including a clutch having a crown] gear *is* keyed to said stem for rotation with said stem and sliding movement along said stem.

5. A setting mechanism for a calendar timepiece comprising a calendar ring, a dial train wheel, a rotatable and longitudinally movable setting stem, a clutch slidably keyed to the end of said setting stem, a setting wheel resiliently biased into engagement with said clutch, means for moving and locking said clutch and setting wheel into an intermediate position when said setting stem is moved to a first innermost position, means for moving and locking said clutch and setting wheel into an outermost position with said setting wheel engaging said calendar ring when said stem is moved to an intermediate position, and means for moving and locking said clutch and setting stem into an innermost position with said setting wheel engaging said dial train wheel when said stem is moved to an outermost position.

6. Apparatus according to claim 5 wherein said moving and locking means comprises a pivoted clutch lever supporting said setting wheel and coupled to said clutch, and a setting lever coupled to said stem and pivoted to cam said clutch lever when said setting stem is in its outermost position.

7. Apparatus according to claim 6 including a pair of pins or said setting lever, and a detent spring engaging one of said pins when said stem is in each of its three positions.

8. A setting mechanism for a calendar timepiece comprising a calendar ring, means including a slip clutch for continuously driving said ring from the dial train of said timepiece, a setting stem, and means for coupling said setting stem to said calendar ring whereby rotation of said stem moves said ring.

9. Apparatus according to claim 8 wherein said coupling means includes means for rotating said ring in both a clockwise and a counterclockwise direction.

10. Apparatus according to claim 8 wherein said slip clutch comprises a pinion, internal teeth on said calendar ring engaged by said pinion, and a wheel driven by the dial train of said timepiece, said wheel being coupled to said pinion by friction.

11. Apparatus according to claim 8 wherein said slip clutch forms part of a synchronizer, said synchronizer comprising a pinion, internal teeth on said calendar ring engaged by said pinion, said pinion being mounted for rotation with a pinion staff, a wheel driven by the dial train of said timepiece rotatably mounted on said staff, and a spring having one end secured to said wheel and its other end resiliently coupling said wheel to said pinion in a predetermined angular relationship.

12. Apparatus according to claim 11 including a cam rotatable with said staff having at least one flat surface, said other end of said spring bearing against said flat surface of said cam.

13. Apparatus according to claim 12 wherein said wheel completes ⅓ of a revolution every 24 hours and said cam is triangular.

14. A setting mechanism for a calendar timepiece comprising a setting stem, detenting means coupled to said stem for detenting said stem into three separate longitudinal positions, a setting wheel, means coupling said stem to said setting wheel when said stem is in a first position, date indicating means including a calendar ring, means coupling said stem to said date indicating means when said stem is in a second position, dial train means, means coupling said stem to said dial train means when said stem is in a third position, and slip clutch means coupled to said calendar ring for continuously driving said calendar ring from said dial train means.

15. Apparatus according to claim 14 including synchronizer means coupled to said calendar ring for synchronizing the position of said calendar ring with respect to the hands of said timepiece after said calendar ring has been set by said stem.

[16. A setting mechanism for a calendar timepiece comprising a rotatable setting stem, a clutch slidably keyed to said stem for rotation therewith, detent means coupled to said stem for detenting said stem into each of three longitudinal positions, a setting wheel coupled to said clutch in one of said positions for winding the timepiece, a calendar ring, means coupling said clutch through said setting wheel to said calendar ring when said setting stem is in a second position, said clutch and setting wheel being operable in response to rotation of said stem to advance said calendar ring, a dial train, and means coupling said clutch through said setting wheel to said dial train wheel when said stem is in a third of said positions, said clutch and setting wheel being operable in response to rotation of said stem to advance said dial train.]

[17. Apparatus according to claim 16 wherein said setting wheel is mounted on a pivoted lever movable into one of three different positions in accordance with the position of said setting stem.]

18. Apparatus according to claim [16] *23* wherein said setting wheel is resiliently biased into engagement with said clutch.

[19. A setting mechanism for a calendar timepiece comprising a rotatable setting stem, detenting means coupled to said stem for detenting said stem into three separate longitudinal positions, a rotatable setting wheel, means coupling said stem to said setting wheel when said stem is in a first position, date indicating means, means coupling said stem through said setting wheel to said date indicating means when said stem is in a second position and operable to advance said date indicating means in response to rotation of said stem and said setting wheel, dial train means, and means coupling said stem through said setting wheel to said dial train means when said stem is in a third position and operable to advance the dial train means in response to rotation of said stem and said setting wheel.]

20. A setting mechanism according to claim [19] *22* wherein said date indicating means includes a calendar ring rotatable in opposite directions in response to rotation of said stem in respective opposite directions when said stem is in said second position.

*21. A setting mechanism for a calendar timepiece comprising a setting stem carrying a gear, detenting means coupled to said stem for detenting said stem and said gear into three separate longitudinal positions, a pivotally mounted setting wheel movable into at least two positions, means coupling said stem to said setting wheel when said stem is in an innermost position and said setting wheel is in one of said two positions, date indicating means, means coupling said stem to said date indicating means when said stem is in an intermediate position, dial train means, and means coupling said stem to said dial train means when said stem is in an outermost position, said coupling means including means for retaining said setting wheel in meshing engagement with said gear in at least one of the intermediate and outermost positions of said stem and said gear and when said setting wheel is in the other of said two positions.*

*22. A setting mechanism for a calendar timepiece comprising a rotatable setting stem carrying a gear, detenting means coupled to said stem for detenting said stem and said gear into three separate longitudinal positions, a pivotally mounted rotatable setting wheel, means coupling said stem to said setting wheel when said stem is in a first position, date indicating means, means coupling said stem through said setting wheel to said date indicating means when said stem is in a second position and operable to advance said date indicating means in response to rotation of said stem and said setting wheel, dial train means, and means coupling said stem through said setting wheel to said dial train means when said stem is in a third position*

*and operable to advance the dial train means in response to rotation of said stem and said setting wheel, each of said coupling means including means for retaining said setting wheel in meshing engagement with said gear in each of the longitudinal positions of said stem and said gear.*

*23. A setting mechanism for a calendar trimepiece comprising a rotatable setting stem, a clutch slideably keyed to said stem for rotation therewith, detent means coupled to said stem for detenting said stem into each of three longitudinal positions, a setting wheel coupled to said clutch in one of said positions for winding the timepiece, a calendar ring, means coupling said clutch through said setting wheel to said calendar ring when said setting stem is in a second position, said clutch and setting wheel being operable in response to rotation of said stem to advance said calendar ring, a dial train, and means coupling said clutch through said setting wheel to said dial train when said stem is in a third of said positions, said clutch and setting wheel being operable in response to rotation of said stem to advance said dial train, said setting wheel being mounted on a pivoted lever movable into one of three different positions in accordance with the position of said setting stem.*

References Cited

The following references, cited by the Examiner, are of record in the patented file of this patent or the original patent.

UNITED STATES PATENTS

| | | | |
|---|---|---|---|
| 2,757,507 | 8/1956 | Boyles | 58—5 |
| 3,248,868 | 5/1966 | Polo et al. | 58—58 |
| 3,319,415 | 5/1967 | Von Aesch et al. | 58—63 |
| 3,353,348 | 11/1967 | Brashear | 58—58 |

FOREIGN PATENTS

| | | | |
|---|---|---|---|
| 351,221 | 2/1961 | Switzerland | 58—58 |
| 376,059 | 4/1964 | Switzerland | 58—58 |
| 394,959 | 12/1965 | Switzerland | 58—58 |
| 412,724 | | Switzerland | 58—58 |

RICHARD B. WILKINSON, Primary Examiner

G. H. MILLER JR., Assistant Examiner

U.S. Cl. X.R.

58—5

UNITED STATES PATENT OFFICE

CERTIFICATE OF CORRECTION

Patent No. Re. 27,290 Dated February 22, 1972

Inventor(s) D. J. Rogers and John A. Van Horn

It is certified that error appears in the above-identified patent and that said Letters Patent are hereby corrected as shown below:

In Column 2, line 41, "result" should read --results--.

In Column 3, line 10, "it" should read --its--; line 29, "settnig" should read --setting--.

In Column 4, line 5, "is" should read --as--; line 25, "hands 14 and 15" should read --hands 14 and 16--; line 65, "portions" should read --portion--.

In Column 6, line 59, "an" should read --as--.

In Column 8, line 5, "doys" should read --days--; line 46, "calender" should read --calendar--.

In Column 9, line 29, Claim 7, "or" should read --on--.

Signed and sealed this 28th day of November 1972.

(SEAL)
Attest:

EDWARD M.FLETCHER,JR.
Attesting Officer

ROBERT GOTTSCHALK
Commissioner of Patents